Oct. 14, 1924.
J. J. BARONI ET AL
1,511,713
DEMOUNTABLE RIM
Filed March 25, 1924
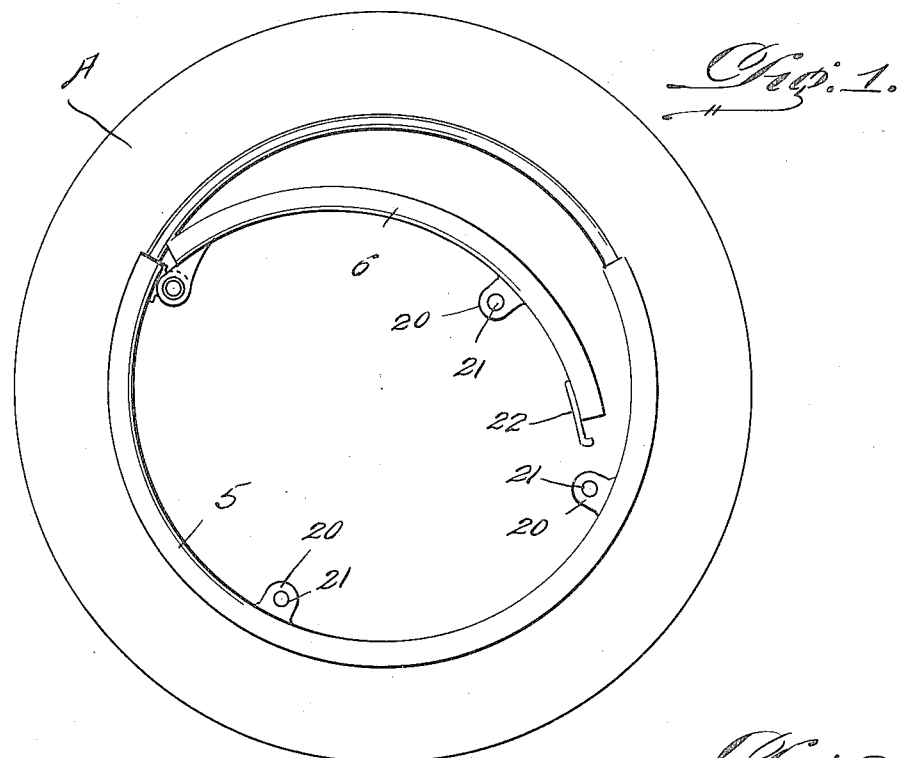
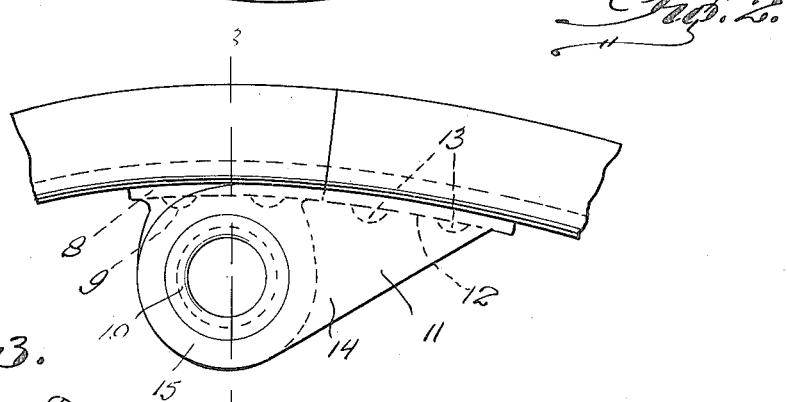
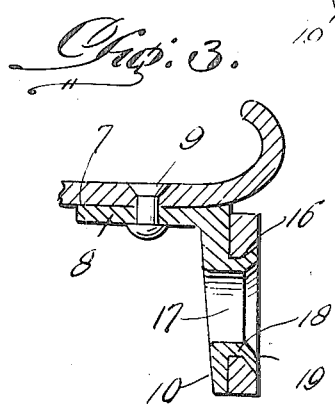
J. J. Baroni,
F. Erbetta,
Inventors
By Clarence A. O'Brien
Attorney Patented Oct. 14, 1924.

1,511,713

UNITED STATES PATENT OFFICE.

JAMES J. BARONI AND FRANK ERBETTA, OF BLACK EAGLE, MONTANA.

DEMOUNTABLE RIM.

Application filed March 25, 1924. Serial No. 701,744.

*To all whom it may concern:*

Be it known that we, JAMES J. BARONI and FRANK ERBETTA, citizens of the United States, residing at Black Eagle, in the county of Cascade and State of Montana, have invented certain new and useful Improvements in Demountable Rims, of which the following is a specification.

This invention relates to tire rims for motor vehicle wheels, and relates more particularly to a rim of the demountable type, the primary object of the invention residing in the provision of a rim wherein the same may be so manipulated as to permit the ready attachment of the tire thereto, or the detachment of the same therefrom, and this without requiring the use of complicated or unhandy tire tools or other implements.

A further object of the invention is to provide a rim of the above character, wherein the same comprises a hinged section, that may be readily detached at one end from the main rim section, in order that the same may be swung toward the central axis of the rim for thereby permitting the quick removal of the tire from the rim, or the positioning of the same thereon.

A further object is to provide a rim, wherein the hinged connection between the main and secondary rim sections is so formed as to provide one of the rim attaching members for securing the rim to the wheel.

An additional and pertinent object is to provide a rim, wherein the same may be manufactured and marketed at an extremely small cost, and wherein the same may be applied to or removed from the vehicle wheel in a novel, simple and expeditious manner.

With the above and other objects in view as the nature of the invention will be better understood, the same comprises the novel form, combination, and arrangement of parts hereinafter more fully described, shown in the accompanying drawing and claimed.

In the drawing wherein like reference characters indicate corresponding parts throughout the several views:

Figure 1 is a side elevational view of a rim constructed in accordance with the present invention, the same being shown as having a tire positioned thereon, and the hinged section of the rim being shown as swung inwardly for allowing the ready detachment of the tire therefrom.

Figure 2 is an enlarged fragmentary side elevational view, for disclosing more clearly the specific hinge connection between the main and secondary rim sections, and Figure 3 is a detailed vertical sectional view, taken substantially upon the line 3—3 of Figure 2.

Now, having particular reference to the drawing, my novel demountable rim for vehicle wheels comprises a main and secondary rim section 5 and 6, respectively, said main section being preferably twice the length of said secondary section. These rim sections are in cross section of a structure identical with the construction of the well known tire rim for vehicle wheels.

At one end of the main section 5 and at the outer edge thereof, the same is provided with an L-shaped bracket designated generally 7, the same comprising the transverse wall 8, that is riveted at 9 to the inner side of said main rim section 5 at a point above indicated, and a right angularly extending wall 10 that depends from the point of attachment to said rim section 5.

The adjacent end of the secondary section 6 carries at its same edge a member designated generally 11 that constitutes an inwardly extending portion 12 for positioning beneath said rim section 6 for attachment thereto, through the medium of rivets or other fasteners 13. This member 11 further includes a pendent ear 14, that extends rearwardly beyond the end of said rim section 6, and the same is provided with an enlarged portion 15, that is formed with a central counter-sunk circular opening 16.

The pendent wall 10 of the member 7 that is carried by the main rim section 5 is formed with an opening 17, from the front edge of which extends a flange or collar 18 that is adapted for extension through the opening 16 in the portion 15 of the ear 14 of said member 11, after which the outer end of this flange or collar is swaged at 19 for engagement within the counter-sunk portion 16 of said member, for providing a swinging rivet connection between the members 7 and 11 carried by the adjacent ends of said rim sections.

Any desirable form of interlocking connection 22 may be provided between the free ends of the rim sections 5 and 6 for manifestly maintaining the rim in an operative condition when the tire A is positioned thereon.

It will thus be seen that we have provided a highly novel, simple and efficient form of demountable tire rim for vehicle wheels, and even though we have herein shown and described the most practical embodiment of this invention, with which we are at this time familiar, it is nevertheless to be understood that minor changes may be made in the invention, without departing from the spirit and scope of the appended claims.

Having thus described our invention, what we claim as new and desire to secure by Letters Patent, is:

1. In a rim of the character described, a main section and secondary rim section having wheel attachment lugs, and a combined hinged connection and wheel attaching lug between one end of the main rim section and one end of the secondary rim sections.

2. In a rim of the character described, a main and secondary rim section, a pair of bracket members carried by adjacent ends of said rim sections, each of which is formed with a pendent wall for overlapping relation with the pendent of the other rim section, said walls being formed with registering openings, a flange surrounding the opening of the wall of one of said members for engagement through the opening of the wall of the other of said members, said flange adapted to be flared outwardly for engagement around the edge of the opening of the wall of the other of said members for providing a hinged connection between said members, as well as a wheel attachment lug.

3. In a rim of the character described, a main and secondary rim section, a pair of bracket members carried by adjacent ends of said rim sections, each of which is formed with a pendent wall for overlapping relation with the pendent of the other rim section, said walls being formed with registering openings, a flange surrounding the opening of the wall of one of said members for engagement through the opening of the wall of the other of said members, said flange adapted to be flared outwardly for engagement around the edge of the opening of the wall of the other of said members for providing a hinged connection between said members, as well as a wheel attachment lug.

In testimony whereof we affix our signatures.

FRANK ERBETTA.
JAMES J. BARONI.